Nov. 15, 1960     T. FREDRIKSSON     2,960,556
ELECTRIC STIRRING WINDING
Filed March 21, 1958     2 Sheets-Sheet 1
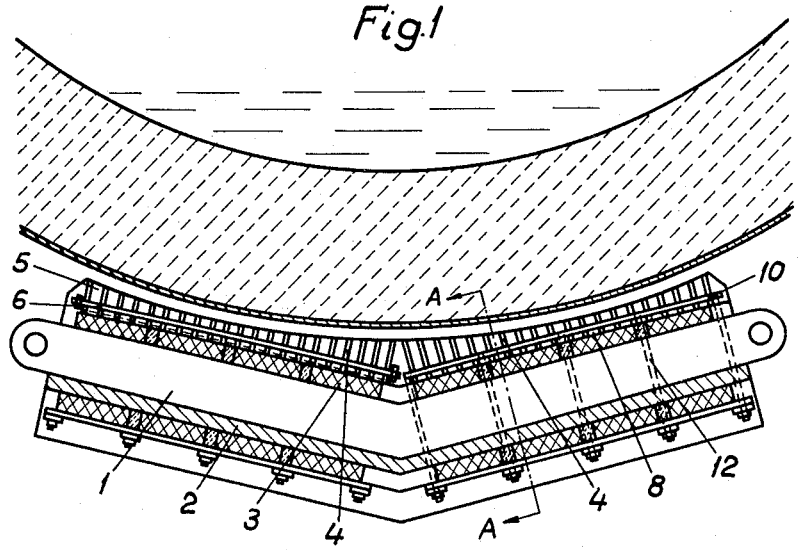
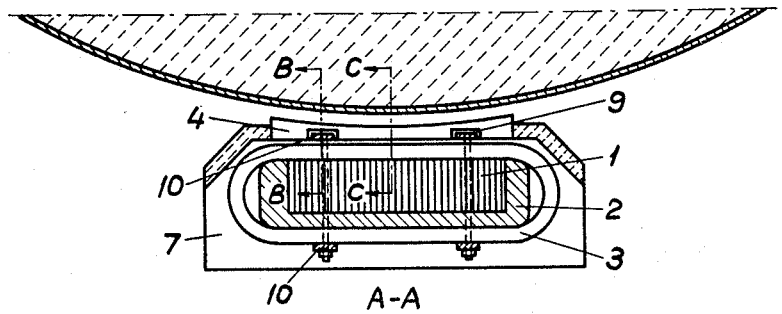
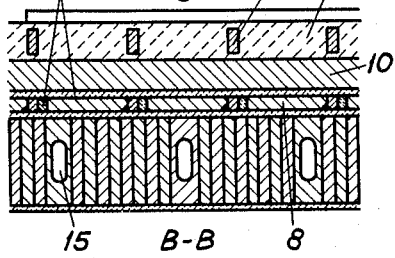 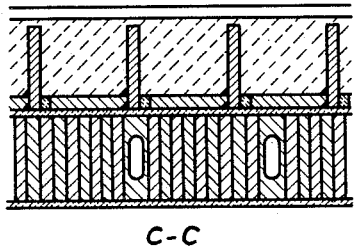
Inventor
Tord Fredriksson
By [signature]
Attorney.

Nov. 15, 1960 T. FREDRIKSSON 2,960,556
ELECTRIC STIRRING WINDING
Filed March 21, 1958 2 Sheets-Sheet 2
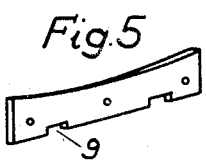
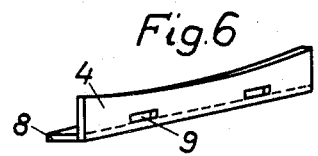
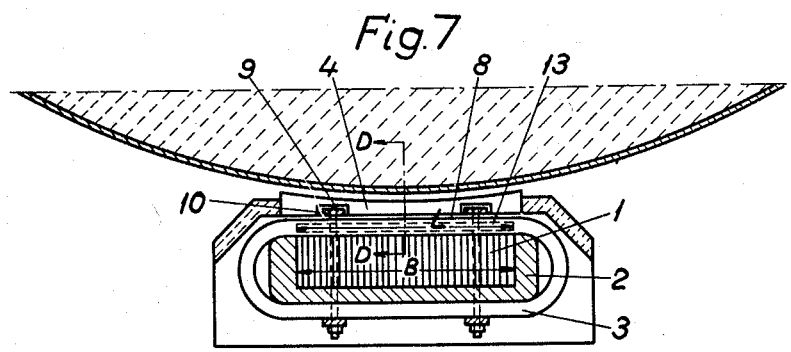
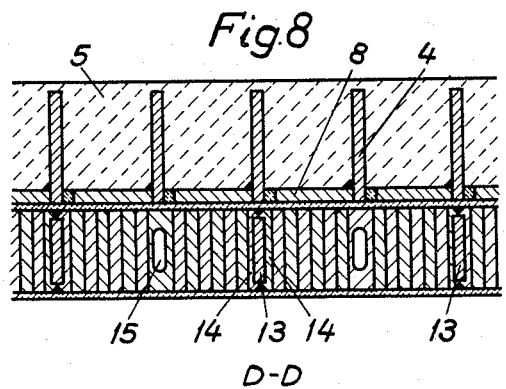
Inventor
Tord Fredriksson
By
Attorney.

2,960,556
Patented Nov. 15, 1960

2,960,556
ELECTRIC STIRRING WINDING

Tord Fredriksson, Vasteras, Sweden, assignor to Allmanna Svenska Elektriska Aktiebolaget, Vasteras, Sweden, a corporation of Sweden Filed Mar. 21, 1958, Ser. No. 722,952

Claims priority, application Sweden Apr. 3, 1957

5 Claims. (Cl. 13—26)

The usual stirring windings, consisting of flat coils embedded in slots in an iron body similar to the stator iron of an asynchronous motor, are often replaced by a winding in which the individual screw-wound coils are slid on a substantially straight iron yoke. If the bottom of the furnace is not plane, the distance between the magnetic part and the bottom of the furnace and the molten metal is for purely geometric reasons greater than desirable for the efficiency of the stirring means. Furthermore, the space required for the stirring winding increases the distance between the stirring means and the molten charge. If the distance between the iron coil and the molten metal can be decreased, the stirring force will be considerably augmented.

The present invention relates to means by which the efficiency of the stirring winding may be increased in spite of maintaining the electric input power. The main idea is that a number of bars having a high magnetic permeability are located at right angles to the laminae of the iron yoke and the longitudinal axis of the winding. Various constructive modifications are possible, some of which will be described by way of example with reference to the accompanying drawing.

Fig. 1 is a section through the lower part of the furnace and the stirring winding. Fig. 2 is a section along the line A—A in Fig. 1. Fig. 3 is a section along the line B—B in Fig. 2, and Fig. 4 is a section along the line C—C in Fig. 2. These figures show different constructions. Figs. 5 and 6 show the bars according to the two embodiments in a perspective view. Figs. 7 and 8 show a further embodiment in connection with an arrangement according to Figs. 2–6. The same parts have the same reference numbers.

The iron yoke 1, having vertical laminations and its lower side and long sides engaging a damping means 2, supports the stirring winding 3 consisting of polyphase screw-wound coils.

The upper side of the winding and the ends of the yoke are covered by a pole shoe like sheet stack, the upper surface of which fits the bottom of the furnace as closely as possible and consists of a large number of bars 4 of high magnetic permeability. The bars are separated by non-magnetic distance pieces 5 for avoiding eddy-flux and held together, according to the left hand side of the Fig. 1, by insulated bolts 6 (see also Fig. 5). The bars are arranged standing and at right angles to the laminations and the longitudinal axis of the winding. The distance pieces may be made of fireproof bricks or may be suitably manufactured by spreading fireproof material into the spaces. 7 is a protection cap.

The right hand side of Fig. 1 and the Figs. 2, 3, 4, and 6 show a modification by which the pole shoe like sheet stack may be fixed in a simple and reliable manner on the stirring winding and where the bolts 6 may be avoided. Each bar 4 of magnetic material is welded together with a bar 8 of non-magnetic material so that the bars form an L iron. The bars 4 have recesses 9 immediately above the welding joint, of such width and height that they can receive holding bars of non-magnetic material, which are usually employed for fixing the coils 3. In the Fig. 5 these recesses 9 are shown open downwardly. The space between each bar 4 and the adjacent bar 8 is filled with an insulating material 11. Also, the bars 8 are insulated from the holding bars 10. These are pressed against the coils by bolts 12 traversing the iron yoke.

For assembly, the longitudinally extending holding bars 10 are first threaded onto the bars 4, 8, these being placed at a desirable distance from each other, and the insulation 11 is laid in. Thereafter the bolts 12 penetrating the iron core 1 are inserted in the bars 10 and screwed on. As a result the coils are fixed with respect to each other and the bars 4 and 8 are fixed on the stirring means. Finally the spaces between the bars 4 are filled with a fireproof material, which forms the distance pieces 5.

A further embodiment according to the invention is shown in Figs. 7 and 8 in combination with the embodiment shown in Figs. 2–4 and 6. Fig. 7 is a cross-section through the stirrer and Fig. 8 a section along the line D—D through the pole shoe like sheet stack and the upper part of the winding. In this part bars 13 of a material of high magnetic permeability are inserted. This may be performed by dividing the conductor of the coil at several places into two parts 14 and providing it with a U-shaped cross-section of such a form that the assembled portions embrace the bar 13, the length L of which is approximately the same as the width B of the iron yoke. The parts are welded or soldered together so that the bars 13 are lying in a tube. By this arrangement the heat stresses within the bar and the conductor are avoided if they have different linear extension coefficients. The bars 13 are suitably placed exactly below the bars 4, in the example shown below each second bar 4, since the space lying below the other bars 4 is occupied by a cooling channel 15 in one winding turn.

It is conceivable for only the bars 13 to be employed, although they are more effective in combination with the bars 4 and 8.

The upper sides of the bars are suitably covered by a filler material 5 so that the bars are protected against the heat radiation from the furnace.

I claim as my invention:
1. A polyphase stirring winding system for stirring the metallic charge in a container for molten metal, comprising a coarsely laminated magnetic yoke arranged substantially below the bottom of said container, substantially cylindric coils slid upon said yoke and supplied with polyphase current, and a plurality of magnetic bar members distributed in spaced relation by spacing means over and standing on the coils in upright position at right angles to the axis of said coils and to the lamination of said yoke, to form a pole-shoe like stack of magnetic sheets the upper side of which closely fits the bottom of the container.

2. A polyphase stirring winding system for stirring the metallic charge in a container for molten metal, comprising a coarsely laminated magnetic yoke arranged substantially below the bottom of said container, substantially cylindric coils slid upon said yoke and supplied, with polyphase current, and a plurality of magnetic bar members distributed in spaced relation by spacing means over and standing on the coils in upright position at right angles to the axis of said coils and to the lamination of said yoke, the magnetic bar members being spaced from each other by distance pieces of fireproof material and provided with holes for receiving insulated fixing bolts for the coils.

3. A polyphase stirring winding system for stirring the metallic charge in a container for molten metal, comprising a coarsely laminated magnetic yoke arranged substantially below the bottom of said container, substantially cylindric coils slid upon said yoke and supplied with polyphase current, and a plurality of magnetic bar members distributed in spaced relation by spacing means over and standing on the coils in upright position at right angles to the axis of said coils and to the lamination of said yoke, the magnetic bar members being spaced from each other by non-magnetic bar members welded together with the magnetic bar members in such a manner that a magnetic and non-magnetic bar member form an L-shaped member and that the magnetic bar members are provided immediately above the welding joints with recesses for receiving insulated holding bars for securing the coils of the stirring winding, the space between each magnetic bar member and the adjacent non-magnetic bar member being filled with insulating fireproof material.

4. A polyphase stirring winding system for stirring the metallic charge in a container for molten metal, comprising a coarsely laminated magnetic yoke arranged substantially below the bottom of said container, substantially cylindric coils slid upon said yoke and supplied with polyphase current, and a plurality of magnetic bar members distributed in spaced relation by spacing means over and standing on the coils in upright position at right angles to the axis of said coils and to the lamination of said yoke, wherein magnetic bars with a length substantially equal to the width of the iron yoke are arranged in some turns of the coils.

5. A polyphase stirring means according to claim 4, in which the magnetic bars are embedded in the tubes which are formed in several turns of the coils by dividing one straight part of the conductor of said turn into two parts of U-shaped cross-section.

References Cited in the file of this patent

UNITED STATES PATENTS

| | | |
|---|---|---|
| Re. 24,462 | Dreyfus | Apr. 22, 1958 |
| 1,236,433 | Herberts | Aug. 14, 1917 |
| 2,363,582 | Gerber et al. | Nov. 28, 1944 |
| 2,512,976 | Smeltzly | June 27, 1950 |
| 2,835,717 | Fredriksson | May 20, 1958 |

FOREIGN PATENTS

| | | |
|---|---|---|
| 444,000 | Great Britain | Mar. 11, 1936 |